June 10, 1924.

W. A. PRIEST

CORN POPPING AND DISPENSING APPARATUS

Filed April 26, 1920   10 Sheets-Sheet 1

1,497,025

Inventor

Millard A. Priest,

By Hiram A. Sturges,

Attorney

June 10, 1924.

W. A. PRIEST

CORN POPPING AND DISPENSING APPARATUS

Filed April 26, 1920   10 Sheets-Sheet 5

1,497,025

Inventor
Willard A. Priest,
By
Hiram A. Sturges
Attorney

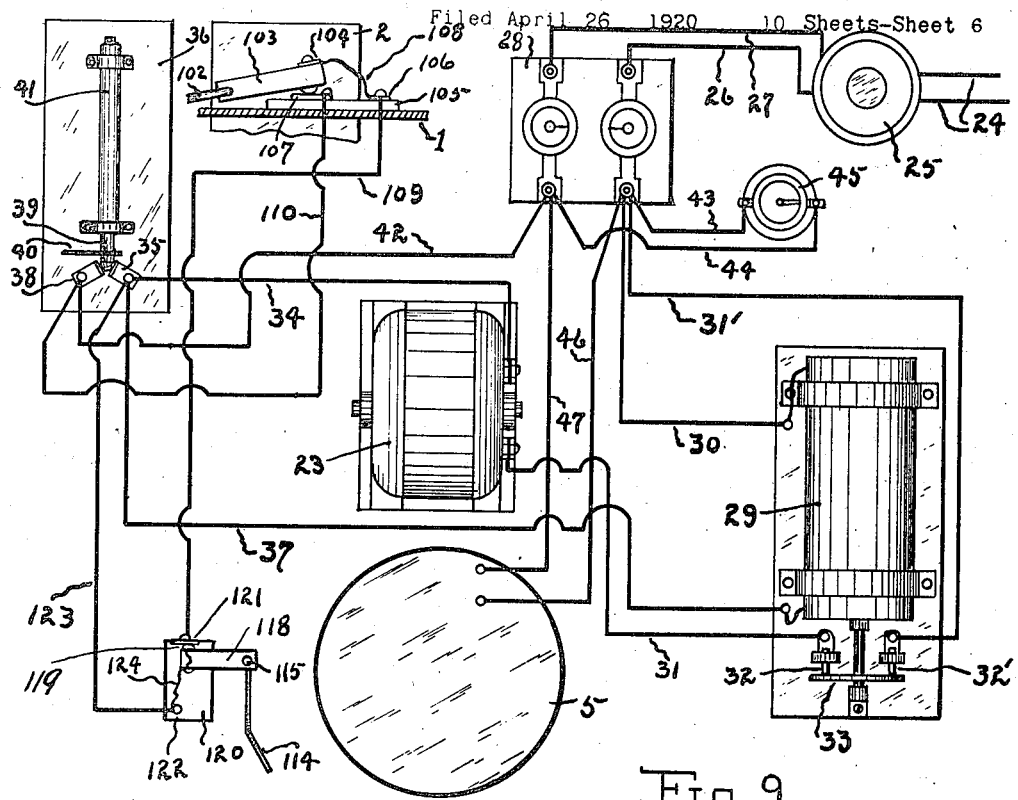
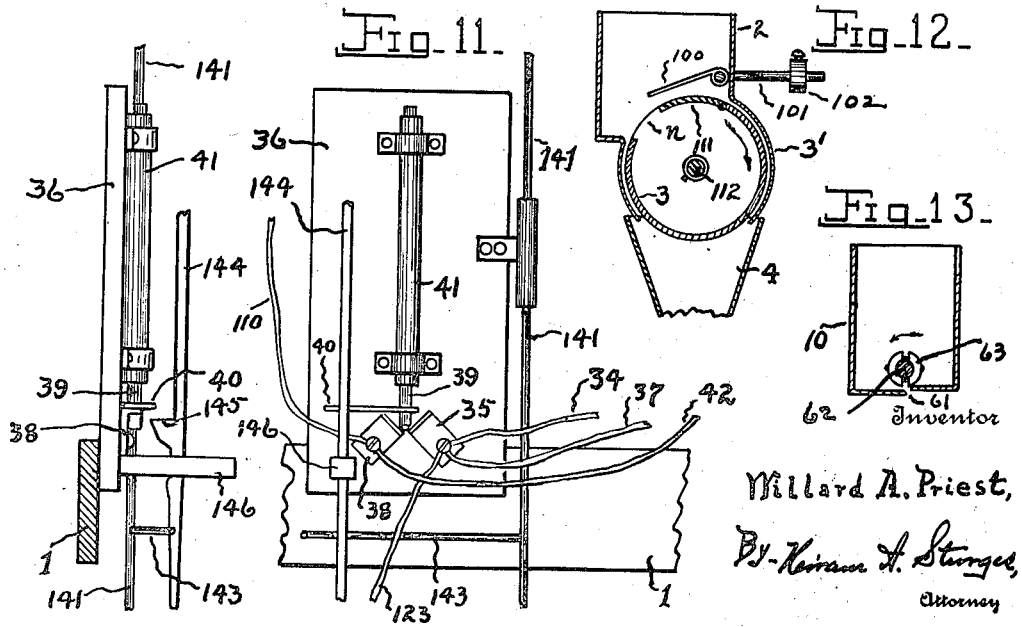

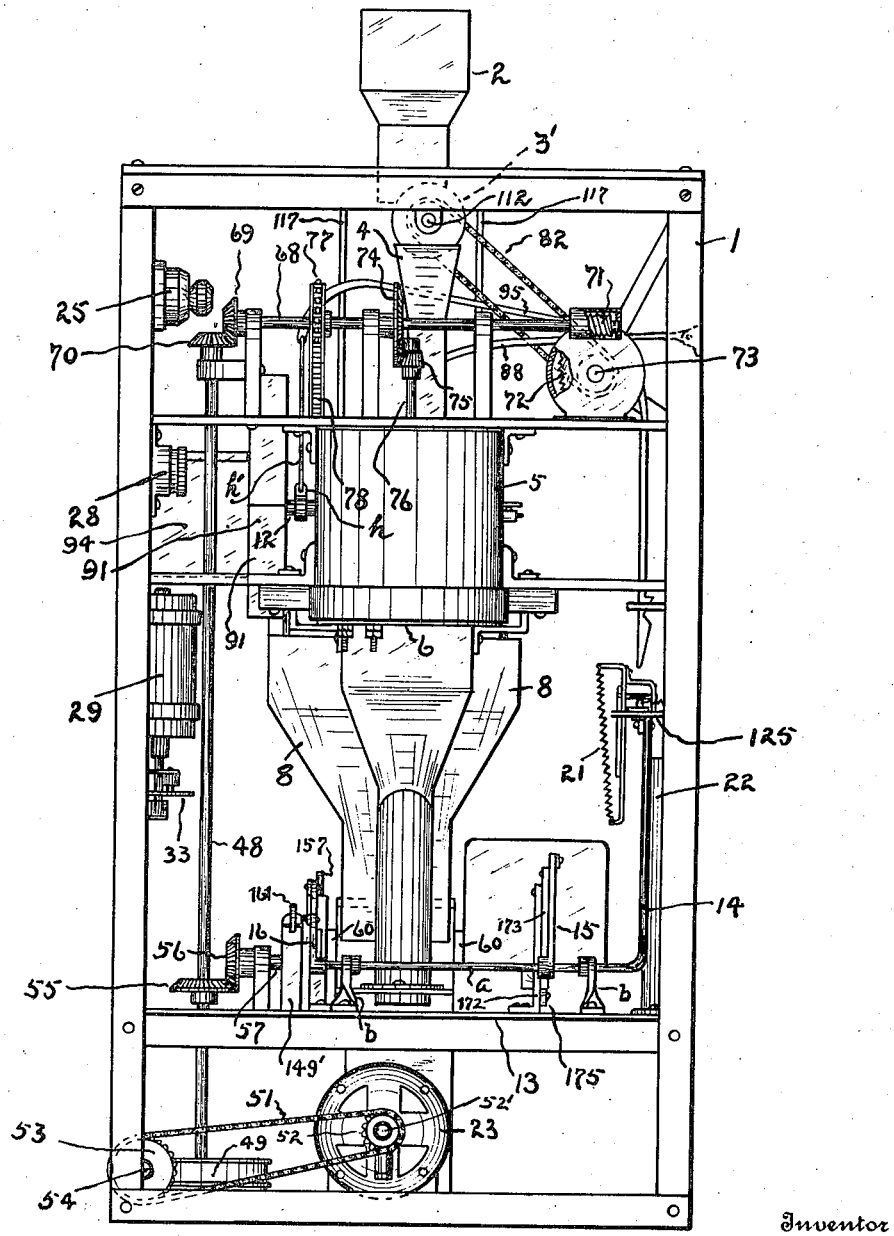

Inventor
Willard A. Priest
By Hiram A. Sturges
Attorney

June 10, 1924.
W. A. PRIEST
CORN POPPING AND DISPENSING APPARATUS
Filed April 26, 1920    10 Sheets-Sheet 9
1,497,025
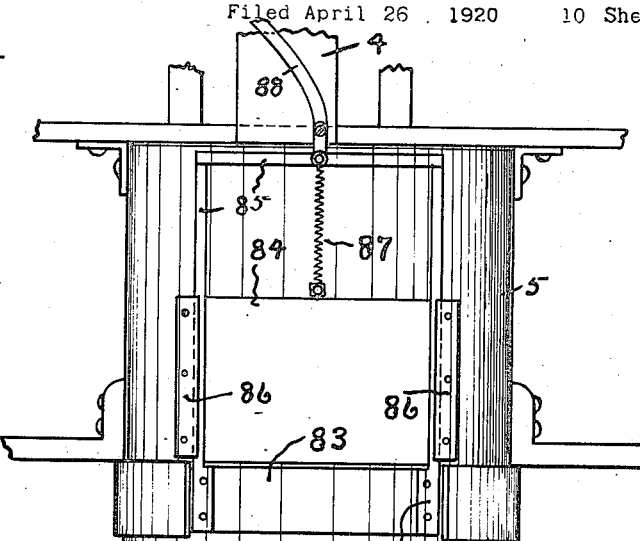
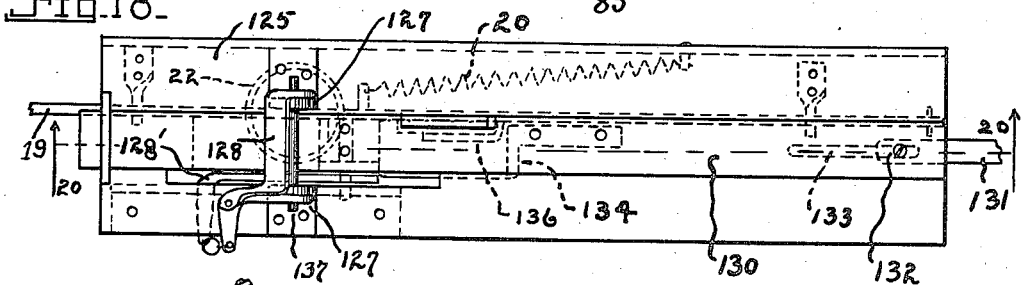
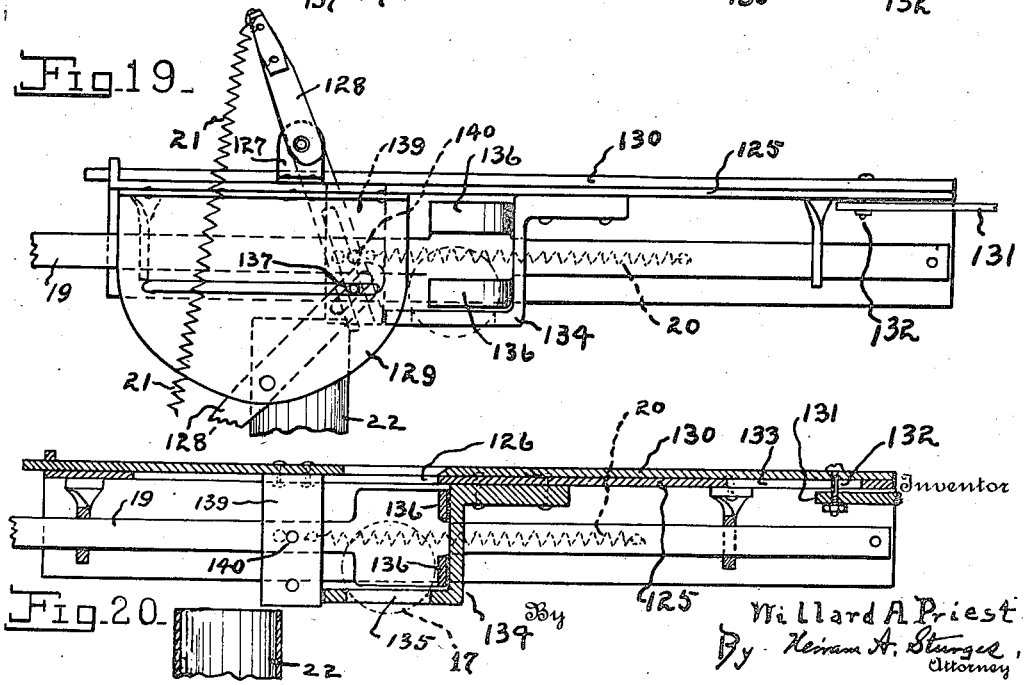
Inventor
Willard A. Priest
By Hiram A. Sturges,
Attorney

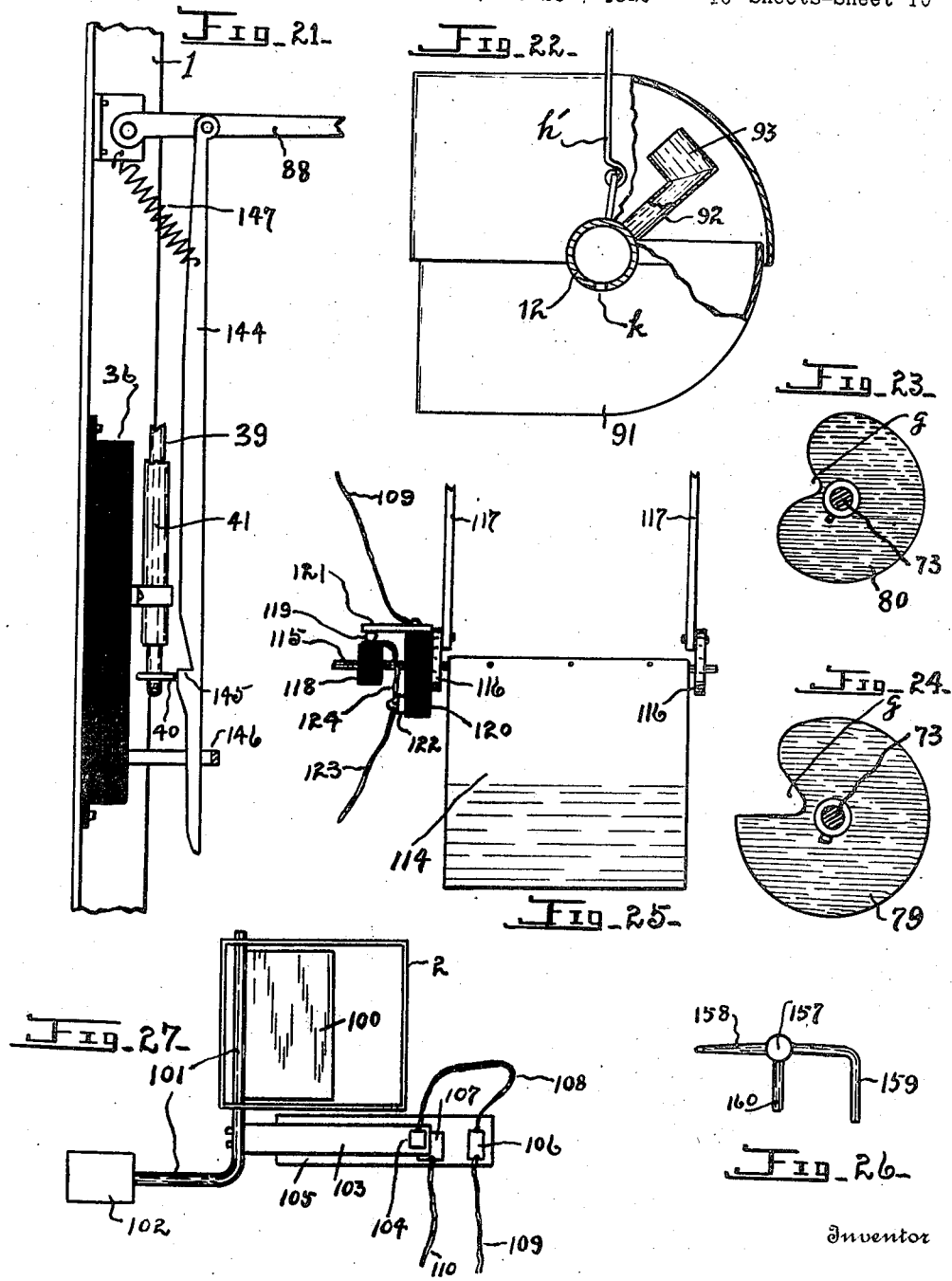

Patented June 10, 1924.

1,497,025

UNITED STATES PATENT OFFICE.

WILLARD A. PRIEST, OF KANSAS CITY, MISSOURI.

CORN POPPING AND DISPENSING APPARATUS.

Application filed April 26, 1920. Serial No. 376,762.

*To all whom it may concern:*

Be it known that I, WILLARD A. PRIEST, a citizen of the United States, residing at Kansas City, in the county of Jackson and State of Missouri, have invented certain new and useful Improvements in a Corn Popping and Dispensing Apparatus, of which the following is a specification.

This invention relates to an improvement in a corn-popping and dispensing apparatus, and includes means which will operate automatically, after a coin has been inserted in a slot, to deliver a measured quantity of corn to an oven, will cause it to be popped, screened and seasoned, and will cause the corn, when popped, to be delivered, means being provided for delivering paper sacks. The invention also includes other features to be explained, and consists of the novel construction, combination and arrangement of parts as described herein and claimed, and as illustrated in the accompanying drawings, wherein,—

Figure 1:
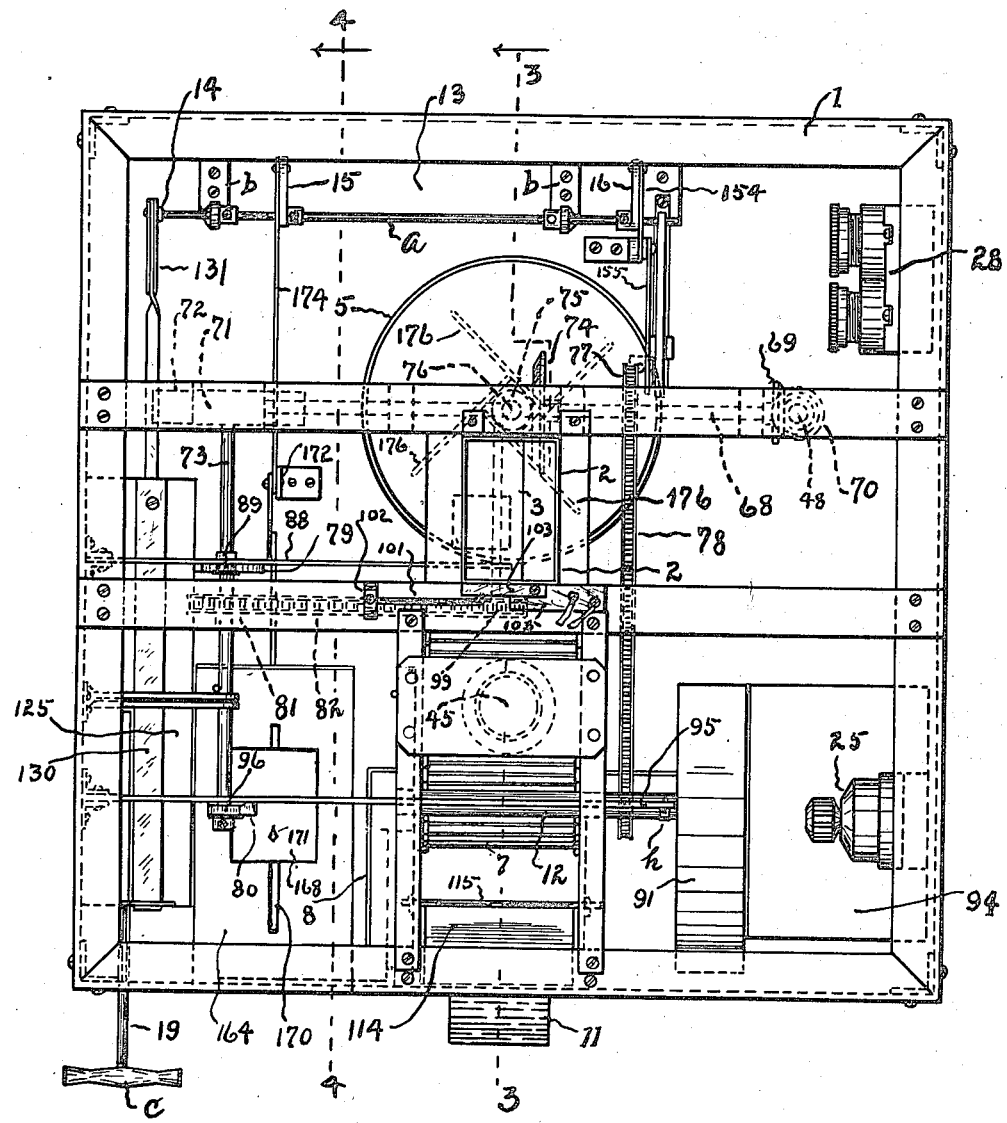
Figure 2:
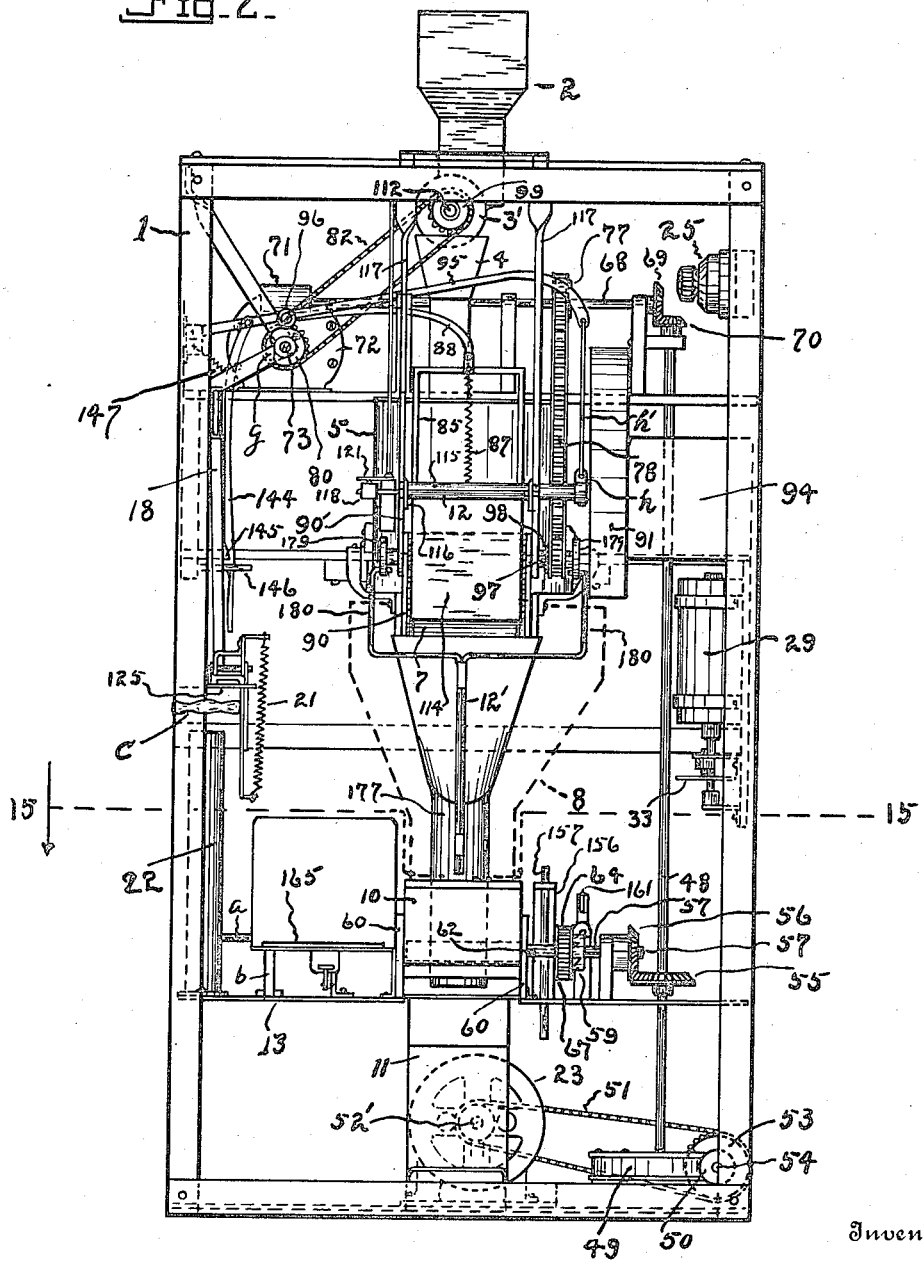
Figure 3:
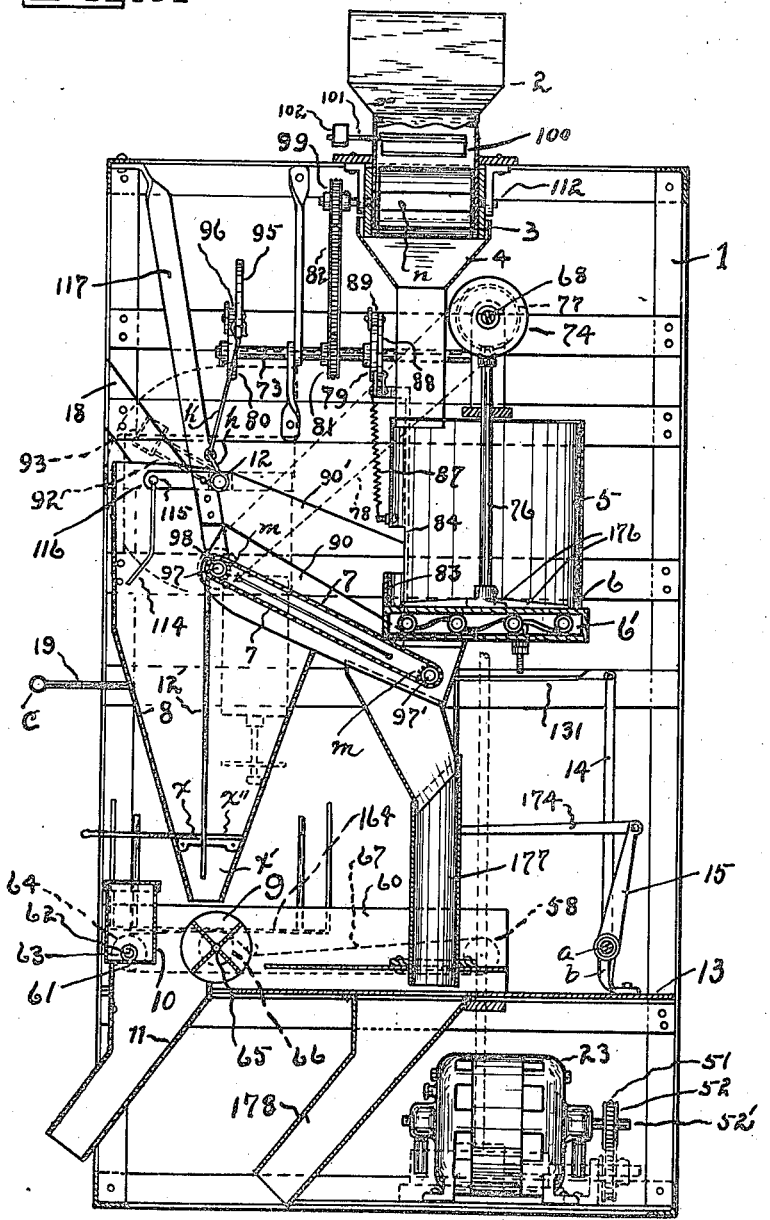
Figure 4:
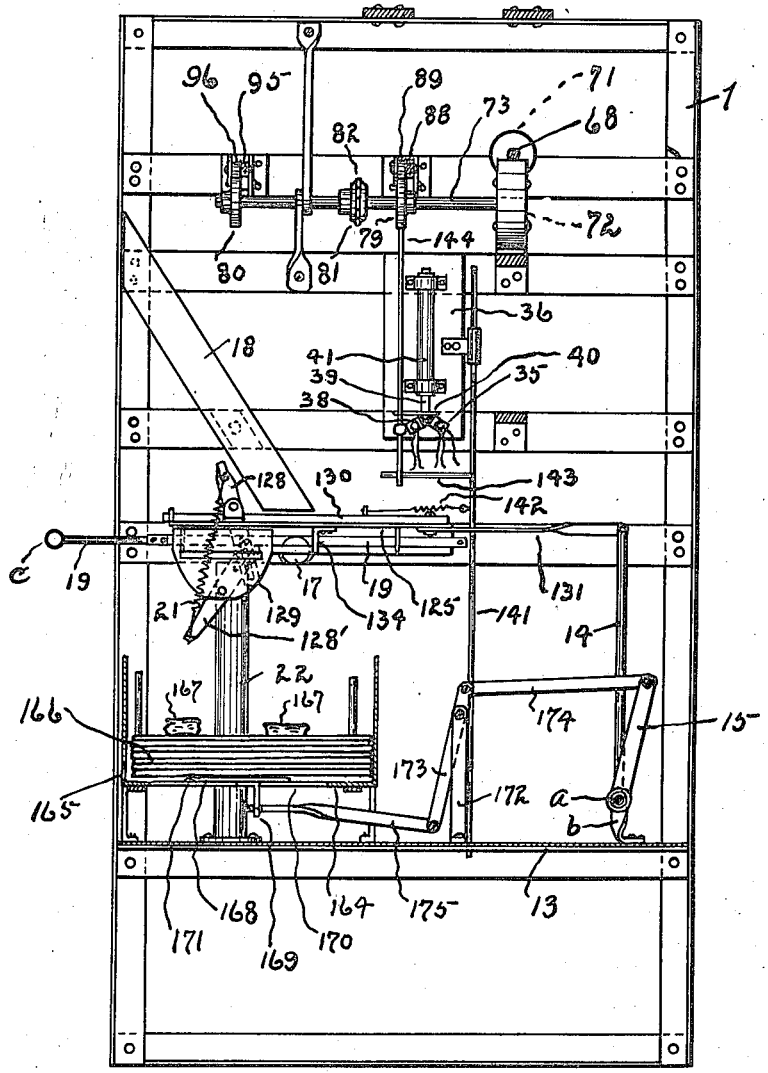
Figure 5:
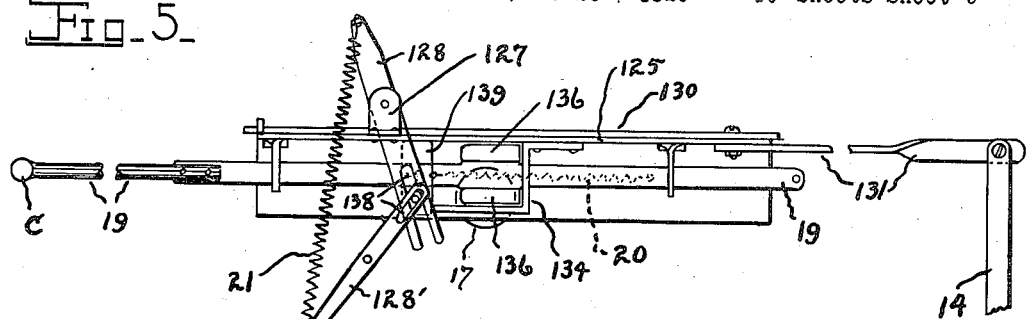
Figure 6:
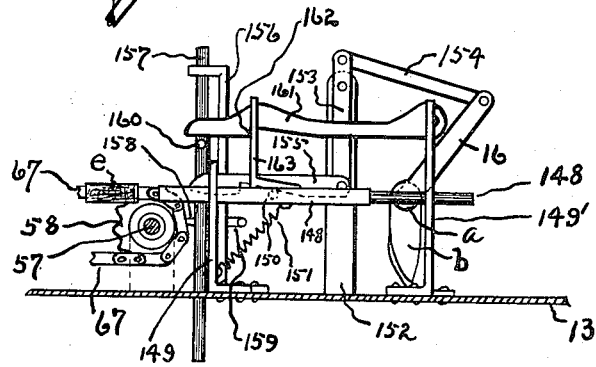
Figure 7:
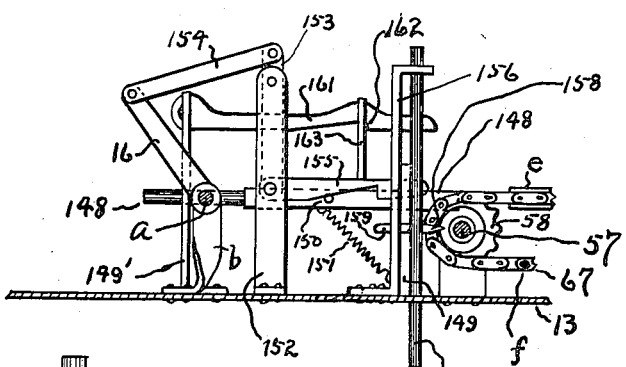
Figure 8:
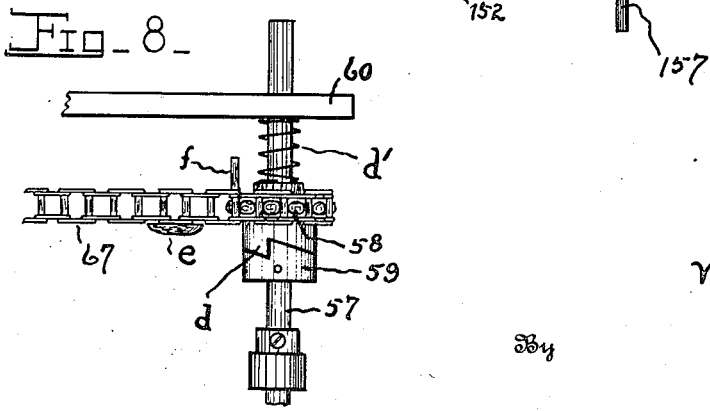
Figure 15:
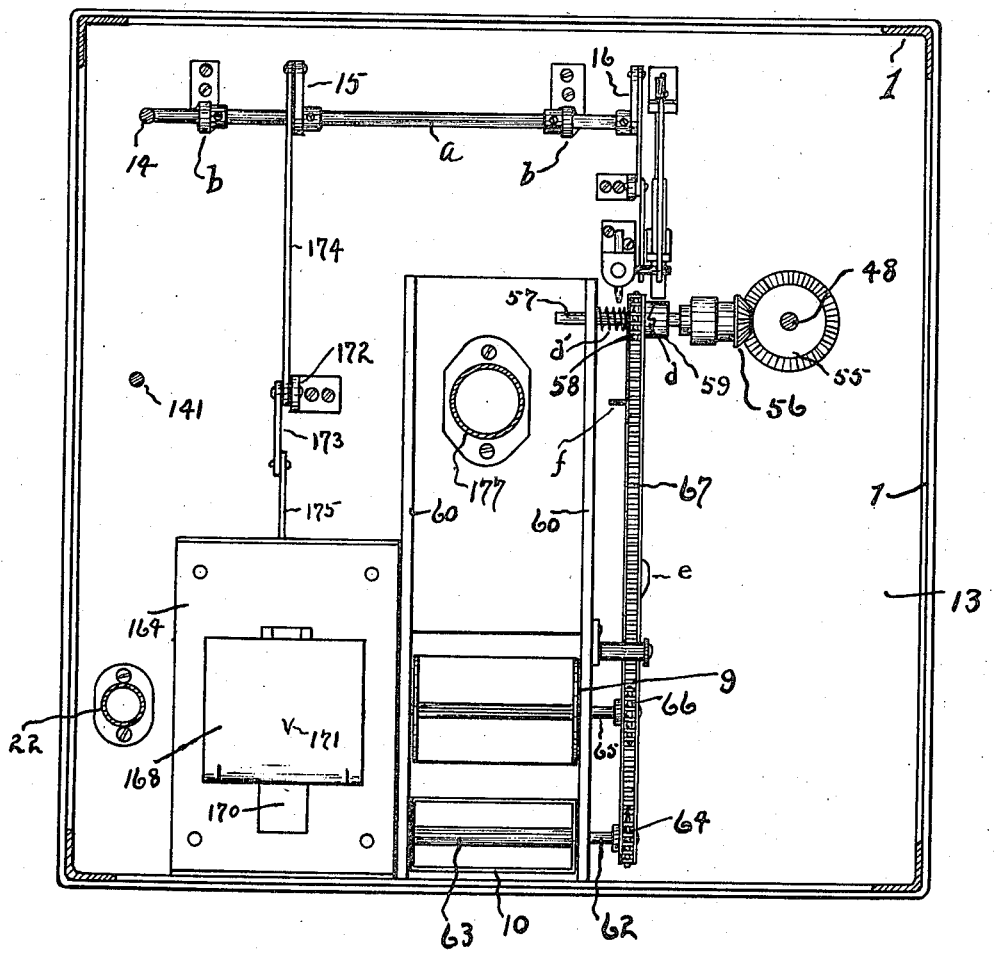
Figure 16:
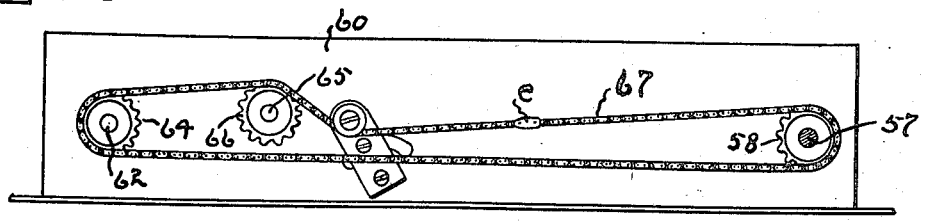

Fig. 1 is a plan view of the apparatus. Fig. 2 is a front view of the same, the funnel being omitted, but indicated by broken lines. Fig. 3 is a sectional view on line 3—3 of Fig. 1. Fig. 4 is a view in longitudinal section on line 4—4 of Fig. 1. Figs. 5, 6, 7 and 8 are broken away views showing details of construction. Fig. 5 is a side view showing a coin delivery device for starting operation of the apparatus. Fig. 6 is a side view of controlling mechanism for the rock shaft. Fig. 7 is a view showing that side of the controlling mechanism opposite to the side shown in Fig. 6. Fig. 8 is a plan view showing a clutch and a sprocket wheel engaged thereby. Fig. 9 is a diagrammatic view illustrating electrical circuits. Figs. 10 and 11, respectively, are side and front views showing means for controlling an electrical switch. Fig. 12 is a sectional view through the cylindrical measuring receptacle. Fig. 13 is a transverse section through the salt dispensing receptacle. Fig. 14 is a rear view of the apparatus. Fig. 15 is a transverse section on line 15—15 of Fig. 2. Fig. 16 is a side view showing the mounting and arrangement of certain sprocket wheels. Fig. 17 is a front view of the oven. Fig. 18 is a plan view of the coin releasing mechanism. Fig. 19 is a side view of the same. Fig. 20 is a sectional view on line 20—20 of Fig. 18. Fig. 21 shows a side view of an actuating-bar and its connections. Fig. 22 is a broken away side view of a butter receptacle. Figs. 23 and 24 are side views of cams. Fig. 25 is a front view of a stop-plate and its connections. Fig. 26 is a plan view of a movable post, being a detail relating to Figs. 6 and 7. Fig. 27 is a plan view of the hopper and parts connected therewith.

Referring now to the drawing, numeral 1 indicates a frame, preferably rectangular in plan and side elevation. At 2 is indicated a hopper for containing a supply of corn, a hollow, revoluble cylinder 3 being disposed below the hopper for measuring the corn and permitting it to pass through a chute 4 to the cylindrical, stationary oven 5.

Numeral 6 (Fig. 3) indicates a heating-plate for the lower part of the oven, electric resistance coils being indicated at 6', and the corn, after it is popped, drops upon an inclined carrier 7 which screens and conducts the popped corn to a funnel 8, from which it is discharged to a revoluble dispensing-member 9 having radially disposed wings and which delivers the corn uniformly to be seasoned from a salt-receptacle 10, and from thence the popped corn is delivered to a chute 11, said corn being also seasoned while moving on the carrier 7 from a perforated, cylindrical butter-dispenser 12, an agitator-bar 12' being movable in the funnel so that the popped corn will be uniformly mixed and seasoned with the butter before it moves under the salt-receptacle, said bar 12' also operating as a tamping-member for pressing the popped corn toward the delivery chute 11.

In order that the operations mentioned may be automatic, certain mechanism is employed consisting, in part, of a horizontal rock-shaft *a* having bearings in brackets *b* which are secured to a horizontal partition 13, near the lower part of the frame, said shaft being provided with arms 14, 15 and 16, and being revoluble in a limited arc in one direction after a coin 17 has been deposited in the coin-chute 18, and also after a pull-bar 19 and its handle *c*, at the front part of the apparatus, have been manually drawn forwardly against the force of a spring 20 and a spring 21, the coin dropping into a coin-delivery chute 22, said shaft *a* having a revoluble movement in an opposite direction by the force of said springs when the bar 19 has been released.

Numeral 23 indicates an electric motor, and it will be seen, as described hereinafter, that it will operate by the forward movement of the pull-bar 19, said motor being energized by any suitable means, electrical service-conductors 24 being shown herein for that purpose, and connected, for convenience, with an "on-and-off" switch 25.

Numerals 26 and 27, best shown in Fig. 9, indicate electrical conductors extending to a fuse-block 28. At 29 is indicated a solenoid, its function being to prevent injury to the electrical connections to be described, said member 29 being in electrical communication with the conductor 26 by means of an electrical conductor communicating with the motor 23 and with the electrical contact-piece 32 which is adapted to engage the slide-plate 33 of the solenoid. The motor is provided with an electrical conductor 34 in electrical communication with a contact-piece 35 which is mounted upon an insulating-block 36, and by means of an electrical conductor 37 the contact-piece 35 is in electrical communication with the solenoid. Numeral 31' indicates an electrical conductor in communication with the conductor 26 and with the electrical contact-piece 32' which also is adapted to engage the slide-plate 33 of the solenoid.

The electrical contact-piece 35 co-operates with the electrical contact-piece 38 in providing an electrical switch for use in connection with a vertically disposed metallic plunger 39 which is provided with a lug 40 for a control of its upward slidable movement in a sleeve 41 which is secured to the block 36, said upward movement of the plunger operating to break certain electrical circuits. The contact-piece 38 is provided with an electrical conductor 42 in communication with the conductor 27 through the fuse-block, and it will be understood that an electrical circuit will be established for energizing the motor when the plunger 39 engages members 35 and 38. Numerals 43 and 44 (Fig. 9) indicate electrical conductors for lighting an electric lamp 45; and for heating the oven 5, electrical conductors 46 and 47 are employed in communication, respectively, with the electrical conductors 26 and 27, through the fuse-block.

The construction includes a vertical shaft 48, adapted to be rotated by operation of the motor, a suitable stationary casing 49 being shown for containing a gear-wheel (not shown) which is provided for said shaft and which is rotated by a worm 50 (Fig. 2), a sprocket-chain 51 being employed and in engagement with the sprocket-wheel 52 of the shaft 52' of the motor and in engagement with the sprocket wheel 53 of the shaft 54 of the worm gear.

Numeral 55 indicates a miter gear wheel which is provided for the vertical shaft 48, said wheel being in engagement with a similar gear wheel 56 of a shaft 57. A sprocket-wheel 58 provided with teeth $d$ is mounted as an idler on the shaft 57. On said shaft is securely mounted a ratchet-wheel 59, whereby, when the teeth at the end of the ratchet-wheel engage the teeth $d$ of the sprocket-wheel 58, the latter will be rotated by the movement of the ratchet-wheel, a spring $d'$ being employed to cause the teeth of the sprocket-wheel to normally engage the teeth of the ratchet-wheel, so that the sprocket-wheel will be rotated while said teeth are in engagement.

The mounting of the salt-receptacle 10, mentioned, is between a pair of side-plates 60 which are secured to the partition 13, the bottom of said receptacle being provided with a slot 61 through which the salt may be discharged. Mounted at the ends of the receptacle 10 as clearly shown in Fig. 13 is a shaft 62 which carries a grooved cylinder 63 and adapted, while the shaft is rotating, to cause a movement of the salt, in small quantities, through the slot 61; and upon the shaft 62 (Figs. 2, 3, 15, 16) is mounted a sprocket-wheel 64.

The distributor 9, mentioned, consists of a shaft 65 having bearings in the side-plates 60 and provided with a sprocket-wheel 66, that part of the shaft between the side-plates being provided with radially disposed wings, as shown. At 67 is indicated a sprocket-chain in engagement with the sprocket-wheel 58, said chain being provided at its opposed sides with lugs $e$ and $f$, and it will be understood that the shafts 62 and 65 will be rotated by engagement of the chain 67 with their sprocket-wheels when the teeth of the sprocket-wheel 58 are in engagement with the teeth of the ratchet-wheel 59.

Disposed above the oven and having suitable bearings, is an operating-shaft 68, said shaft being rotatable by means of a miter gear wheel 69 in engagement with a similar wheel 70 which is provided for the upper end of the vertical shaft 48. The shaft 68 is provided at one of its ends with a worm 71 in engagement with a gear wheel 72 for rotating a horizontal cam-shaft 73, and is provided with a gear-wheel 74 in engagement with a pinion 75 for rotating a vertical stirring-shaft 76 which is disposed centrally of the cylindrical oven, and is also provided with a sprocket-wheel 77 upon which is mounted a sprocket-chain 78.

Numerals 79 and 80 respectively indicate cams which are mounted upon the shaft 73, said shaft also being provided with a sprocket-wheel 81 upon which is mounted a sprocket-chain 82. The parts are so proportioned that the shaft 73 together with the cams and wheel 81 thereon, will make one revolution while one portion of corn from the cylinder 3 is being popped in the oven.

Each cam is provided with a peripheral recess $g$. The cam 79 is for the purpose of controlling one of the movements of an apron or door 83, adapted to cover a part of the opening 84 at the front of the oven, said apron being provided with a rectangular frame 85 adapted to move in guides 86 which are secured to the wall of the oven. A spring 87 is provided which is connected with said wall and frame 85, tending to move the apron downwardly to permit the popped corn to be moved outwardly from the opening 84 of the oven, to fall upon the carrier 7.

Numeral 88 indicates a lever having its ends pivotally mounted respectively, upon the frame 85 and upon the frame of the apparatus. The lever 88 is provided with a roller 89 in engagement with the cam 79, the result in operation being that the apron 83 will remain in an elevated position during the greater part of a single rotation of the cam, for covering the lower part of the opening 84, and when the roller enters the recess $g$ of the cam 79, the apron will be lowered.

The cam 80 is for the purpose of controlling the movements of a horizontal butter-dispenser or tubular receptacle 12 which is disposed transversely of and above the carrier 7, said receptacle being provided with an arm $h$ and having aligning perforations $k$ formed in its side, and being journalled in upright extension-plates 90' of the pair of side-plates 90 (Figs. 2, 3) which project forwardly from the opening 84 of the oven, said member 12 also having journalled bearings in the side-wall of a container 91 for melted butter and being provided with a filling-tube 92 which is disposed at right-angles thereto and which is provided with a terminal cup 93. Numeral 94 indicates a receptacle for the storage of butter, said receptacle being in communication, near its bottom, with the container 91 by means of a suitable passageway (not shown).

The receptacle 12 is adapted to move in an arc, approximately, of 90 degrees, to dispose the cup 93 at or near the bottom of the container 91 for butter to enter said cup, and it will be understood that when the cup is elevated, a measured quantity of butter will pass through the tube 92 and will enter said receptacle 12, and by gravity, will pass through the perforations $k$. The movement mentioned for the receptacle 12 is effected by means of a lever 95 having a rod $h'$ for a connection of one of its ends with the arm $h$ of said receptacle, its opposite end having a pivotal mounting upon the frame of the apparatus, said lever being actuated by the cam 80. Numeral 96 indicates a roller which is mounted upon the lever 95 and which engages the cam 80, and it will be seen that, during operation, the cup 93 will remain in an elevated position to permit a movement of butter from the tubular arm to be discharged through the perforations mentioned until the roller 96 enters the depression or recess $g$ of said cam 80, at which time the arm 92 and its cup will move to the lower part of the container 91 to be refilled.

Numerals 97 and 97' (Fig. 3) indicate horizontal shafts which are journalled in the side-plates 90, each shaft being provided with teeth $m$ for engaging between the cross-strips of the endless, inclined carrier 7, said carrier being adapted to conduct the corn outwardly from the oven after it has been popped, the means for said movement being the sprocket-chain 78 which engages the sprocket-wheel 98 of the carrier-shaft 97 and movable by the sprocket-wheel 77.

Means are provided for supplying a measured quantity of corn to the hollow cylinder 3, said cylinder being provided with a slot $n$ (Fig. 12) in its side, and being revoluble by means of the sprocket-chain 82 which engages a sprocket-wheel 99 mounted on a shaft 112 which carries the cylinder, the operation being that while the cylinder is slowly rotating, the slot $n$, a part of the time, will be in register with the hopper 2, to permit corn to pass therethrough to the cylinder so that the latter will be filled from the hopper during a part of the revoluble movement of said cylinder, and thereafter, during said revoluble movement, the corn will be discharged to the chute 4, said cylinder being disposed in a sleeve or casing 3', and the proportion of parts being such that the cylinder 3 will make one revolution during a rotation of the cam-shaft 73.

Numeral 100 (Fig. 12) indicates a wing which is mounted rigidly upon an L-shaped lever 101 having bearings in the lower part of the hopper and adapted to have a swinging movement, in a limited arc, under control of a block 102 secured to said lever and which, by operation of gravity, tends to cause an upward swinging movement of the wing, the weight of the corn in the hopper upon said wing, however, being sufficient to normally cause the wing to swing downwardly. Upon said L-shaped lever, at the side of the hopper, as best shown in Fig. 9, is mounted an insulating block 103, provided with an electrical contact-piece 104; and upon the top of the frame of the apparatus is mounted a second insulating-block 105 provided with electrical contact-pieces 106 and 107, the electrical contact-piece 106 having an electrical conductor 108 communicating with the electrical contact-piece 104. Numerals 109 and 110 indicate electrical conductors communicating, respectively with the electrical contact-pieces 106 and 107, said last named conductors being employed as parts of an electrical circuit, the object of said circuit being to terminate operation if the hopper 2 should become empty.

The cylinder 3 is provided with a door 111, best shown in Fig. 12, adapted to swing outwardly, and it will be understood that the cylinder operates to measure the charges of corn which enters it through the slot $n$ and that the door will swing outwardly when in its lowermost position to permit the contents of the cylinder to enter the chute 4.

It will be understood that the weight of the corn upon the wing 100 will cause it to swing downwardly, and that the lever 101 will have a rotatable movement, the block 103 also being swung downwardly, this movement of the block 103 causing an electrical communication of the conductors 109 and 110 for the reason that the conductor 108 is in electrical communication with members 104 and 106 as above explained, and on account of this arrangement of parts, if no corn is in the hopper the electrical contact-pieces 104 and 107 will not be in engagement, the result being that the electrical communication of the conductors 109 and 110 will cease if no corn is in the hopper, and this is a desirable feature, since the apparatus should not operate if no corn is in the hopper.

Numeral 114 indicates a stop-plate which is disposed near the front end of the carrier 7 and is secured to a horizontal rod 115 which is mounted to permit swinging movements upon a pair of arms 116 supported by a pair of hangers 117 which are secured to the frame of the apparatus. Upon the rod 115 is secured an insulating-block 118 which is provided (Fig. 25) with an electrical contact-piece 119. Upon one of the arms 116 is secured an insulating-block 120 provided with an electrical contact-piece 121 in communication with the electrical conductor 109, and provided with an electrical contact-piece 122 having an electrical conductor 123 communicating therewith and also communicating with the electrical contact-piece 35. Numeral 124 indicates a flexible electrical conductor communicating with the electrical contact-pieces 119 and 122, which however, will not prevent a swinging movement of the rod 115 and its plate 114, and it will be understood that if the operation of popping corn was continued until the popped corn filled that part of the funnel 8 below the carrier 7 and the area between the plates 90, said corn, during its forward movement would be pressed against the plate 114, which would prevent further operation of the apparatus, since said member 114 would be swung forwardly and would cause disengagement of the electrical contact pieces 119 and 121, the electrical circuit provided by the conductors 109 and 123 being broken.

When arranging the apparatus for operation so that a measured quantity of popped corn will be delivered from the chute 11, after a coin has been deposited, as mentioned, the spaces between the side-plates 90 and the funnel 8 are first filled with popped corn sufficient to cause the plate 114 to be pressed forwardly to cause disengagement of the electrical contact-pieces 119 and 121, and when the parts are thus arranged the apparatus is nearly ready for use. Upon drawing a slide $x$ (Fig. 3) forwardly the corn will pass from the funnel 14 sufficient to fill the chamber $x'$ below the slide and to fill one of the compartments between two adjacent wings of member 9, and a part of the corn in the upper part of the funnel will then be moved from the plate 14 to permit it to swing inwardly so that the contacts 119 and 121 will be in engagement, and if a coin is then inserted in the chute 18 the apparatus will operate, the delivery being a part of the popped corn which had previously been popped, the oven receiving a measured quantity of corn at each operation and the carrier 7 moving it forwardly.

After the slide $x$ has been withdrawn it is not replaced, and the wings of member 9 are depended upon for preventing a movement of the corn to the chute 11, from the funnel, said member 9 not revolving except when the carrier is moving.

The coin receiving and releasing mechanism consists, in part, of a horizontal supporting-plate 125 which is secured to the frame 1, said plate having an aperture 126 through which the coin may pass from the coin-chute 18, and having brackets 127 mounted thereon for the support of a rock-arm 128 for a mounting of one end of the spring 21, a rock-arm 128' co-operating therewith and providing a mounting for the opposite end of said spring, the rock-arm 128' being mounted on a vertical slotted plate 129 which is secured to the plate 125. Numeral 130 indicates a draw-bar which is connected at its inner end with a link 131, said link being connected with the arm 14. The draw-bar is disposed flatwise upon the horizontal plate 125, and is adapted to have a slidable movement thereon, the pin 132, which connects the link 131 with the draw-bar 130 being disposed in a slot 133 which is formed in said plate 125.

Disposed below and secured to the plate 125 is a hanger 134 of angular form which is provided with a slot 135 adapted to receive the coin when it passes from the chute 18. The pull-bar 19 is provided with a pair of hooks or curved arms 136 which also receive the coin and operate to hold it in a vertical position before it enters the chute 22, and when the bar 19 is drawn forwardly, the coin will be moved therewith and will enter the chute 22, said chute being disposed adjacent to and below the terminals of the arms 136. Upon the pivot-pin 137, which engages in the slots 138 (Figs. 18, 19) of the rock-arms 128 and 128′, is mounted a plate 139 upon which is mounted a projection 140 adapted to engage the coin while the latter is moving forwardly, and on account of this construction the draw-bar 130 will also be drawn forwardly against the force of the springs 20 and 21, which, as described, will cause a partial rotation of the shaft a.

Numeral 141 (Fig. 4) indicates a vertical pivot-post adapted to have a limited revoluble movement by the forward movement of the draw-bar 130, the conection between these parts to cause this movement being a spring 142 (Fig. 4), said post 141 being provided with an arm 143. Numeral 144 (Figs. 2, 4) indicates an upright actuating-bar which is pivotally mounted at its upper end upon the lever 88, said bar being provided with a ledge or hook 145 and adapted to move in the slot of a guide 146 and to engage the lug 40 of the plunger 39, said guide preferably being mounted on the insulating-block 36, a spring 147 being employed to normally press said bar 144 toward the lug 40, and it will be understood that when the lever 88 swings downwardly the hook 145 will engage the lower side of the lug 40 by operation of the spring 147, and when the lever 88 swings upwardly by operation of the cam 79 for elevating the apron 83, the lug 40 will be elevated to terminate communication of the electrical contact-piece 35 with the electrical contact-piece 38.

Means are provided to prevent operation of popping corn for any longer period of time than is required for a complete rotation of the cam-shaft 73, and to prevent a delivery of more than one measure of popped corn by use of a single coin, said means consisting, in part, of a locking-bar 148 slidably mounted in a pair of brackets 149 and 149′ which are mounted upon the partition 13, said bar being disposed adjacent to the ratchet-wheel at right angles to the shaft 57 and provided with a lug 150 and having a spring 151 attached to the bracket 149 normally tending to move the bar forwardly to cause it to engage the lug e of the sprocket chain 67 while the latter is moving, said engagement causing the wheel 58 to slide on the shaft 57 against the force of the spring d′, with the result that the teeth d will be disengaged from the ratchet-wheel 59, the movement of the sprocket-chain 67 ceasing and therefore terminating rotation of the shafts 62 and 65.

The means for moving the bar 148 outwardly from the sprocket-wheel 58 and chain 67, so that the wheel 58 will be free to rotate, consist of certain levers movable by the rock-shaft a. At 152 is indicated a bracket which is mounted on the partition 13, upon said bracket being mounted a rock-lever 153 which is connected with the arm 16 by means of a link 154. At 155 is indicated a hook-arm adapted to engage the lug 150 of the locking-bar 148, and when so engaged the bar 148 will be drawn outwardly from the sprocket-chain 67 by a movement of the rock-shaft a, the arm 16 which moves with said rock-shaft a causing a movement of the bar 148 when said rock-shaft is rotated, since the link 154 and rock-lever 153 (Figs. 6, 7) will be actuated.

At 156 is indicated a bracket which is disposed adjacent to the bracket 149 and it operates as a guide for the vertical sliding movements of a post 157, said post being also guided by its bearings in a suitable aperture formed in the partition 13 and being provided with arms or lugs 158, 159 and 160. At 161 is indicated a dentent-bar which is pivotally mounted at its outer end in the bracket 149′, its inner end being disposed above the lug 160 of the post 157, said bar 161 being provided in its lower side, between its ends, with a tooth 162. The locking-bar 148 is provided with an upright guide-arm 163 having a slot opening on its upper end for receiving the detent-bar 161 and operating as a catch for the tooth 162, and it will be understood that during the movement of the sprocket-chain 67, its lug f will engage the lug 158, which will cause the post 157 to slide upwardly, its lugs 159 and 160 causing members 155 and 161 to be released from the respective lugs 159 and 160, whereupon the locking-bar will slide inwardly by operation of its spring 151.

It will be seen that, after a coin has been deposited in the chute 18 and the bar 19 has been drawn outwardly by an operator, the arm 16 of the rock-shaft a will be swung inwardly, and when the operator releases the bar 19, the springs 20 and 21 will cause the arm 16 to swing outwardly. The inward movement of the arm 16 will cause the bar 148 to move longitudinally out from the path of movement of the lug e of the sprocket-chain 67, and the teeth d of the sprocket-wheel therefore will remain in engagement with the ratchet-wheel, and operation may be continued until said teeth are disengaged therefrom. The parts are so proportioned that the cylindrical measuring receptacle 3 will contain sufficient corn to be popped during one complete movement of the chain 67.

It will be noted that, during the movement of the sprocket-chain 67, just after the lug e has been disengaged from the locking-bar 148, the lug f of said chain will engage the lug 158 of the post 157 to cause elevation of the post, and that the elevation of said post will cause an upward swinging movement of the detent-bar 161 for releasing the arm 163 from the tooth 162, with the result that the locking-bar 148 will, by force of the spring 151, move inwardly, so that it may be engaged by the lug e of the sprocket-chain 67.

The function discharged by the mechanism shown, for the most part, in Figs. 6, 7 and 8, is to prevent continued operation, by use of a single coin; and if the pull-bar, by use of its handle c is drawn outwardly and maintained in that position for the purpose of allowing all of the corn to be popped and delivered, it will be seen that the mechanism just described will prevent such operation for the reason that the lug e will detach the teeth of the sprocket-wheel 58 from the ratchet-wheel 59, and the popped corn will be delivered only while the sprocket-chain 67 is moving.

Means are provided for delivering paper bags, said means consisting, in part, of a horizontal plate 164 having upset ends and disposed at the front of the apparatus, the upset end of said plate being provided with a slot 165 through which the bags 166 may pass, weights 167 or equivalent means being disposed on the bags to press them downwardly upon a slide-plate 168 adapted to be reciprocated by a movement of the arm 15 of the rock-shaft a, a bracket 169 being secured to the slide-plate and adapted to work in a slot 170 formed in the horizontal plate 164, a tooth 171 being provided for the slide-plate which engages the lowermost bag to move it outwardly from the aperture 165, for use of the person operating the apparatus, who, by holding it beneath the chute 11, may have it filled.

Numeral 172 indicates a bracket which is mounted upon the partition 13 to provide a mounting for a rock-lever 173, one of the ends of the latter being mounted upon a link 174 which is connected with the arm 15, the opposite end of said rock-lever being connected with a link 175 which is pivotally mounted upon the bracket 169.

Numerals 176 (Figs. 1, 3) indicate horizontal blades which are mounted upon the lower end of the shaft 76 and engaging the bottom of the oven, and during the rapid revoluble movement of said shaft and when the apron 83 has been lowered, any corn remaining unpopped, will be thrown outwardly through the opening 84 to fall upon the carrier 7, and will be discharged through the chutes 177 and 178, to the lower part of the apparatus, the cross-rods of the carrier being suitably spaced apart and operating as a screen to permit the unpopped kernels to pass downwardly therebetween, and being disposed sufficiently close together to prevent the popped corn from passing therethrough.

Numerals 179 indicate a pair of projections or discs which are rigidly mounted on the shaft 97 at or near the ends thereof. Mounted pivotally in members 179, outwardly of the longitudinal axis of the shaft 97, are the arms 180 of the agitator or tamper-member 12', and the rapid movements of the latter are depended upon for moving the popped corn through the downwardly convergent funnel 8 as well as for discharging its first named function, said member 12' being disposed and movable in the slot x'' of the slide-plate x before the latter has been withdrawn.

Relative to the make-and-break, electrical control for the connections of the stop-plate 114, it should be stated that when this plate is moved outwardly and causes disengagement of the electrical contact-pieces 119 and 121, operation will not immediately cease, but operation of the apparatus will cease as soon as the cam 79 completes a rotation, said movement being completed soon after the roller 89 enters the recess g of said cam. The entry of said roller in the recess causes the actuating-bar 144 to move downwardly to dispose its ledge or hook 145 below the lug 40 of the plunger 39, and the remaining part of the rotation of the cam 79 will cause an upward movement of the bar 144 and its ledge, the plunger 39 thereby being elevated to terminate the electrical communication of the contact pieces 35 and 38, which terminates further operation of the apparatus until another coin has been deposited in the chute 18.

After a coin has thus been deposited, the operation of moving the pull-bar 19 forwardly causes an outward swinging movement of the lower end of the bar 144 which permits the plunger 39 to engage the electrical contact-pieces 35 and 38. When the operator releases the bar 19 the arm 143 of the post 141 will move the bar 144 against the force of its spring 147, which permits the plunger 39 to drop into engagement with members 35 and 38, and operation will continue thereafter until said plunger has been elevated by the hook or ledge 145 of the actuating-bar.

I claim:

1. In a corn popping and vending machine, the combination of a stationary electric stove provided with a spillway in its side, a rotary stirring device operating in said stove and provided with radially extending fingers for sweeping the stove, a gate slidably mounted on said stove and over the spillway therein, a pivoted lever attached to said gate, a revolving cam arranged to raise and lower said lever, a hopper, a feeder communicating alternately with said hopper and said stove, a travelling carrier arranged to carry popcorn spilled from said stove, a bin arranged to receive the popcorn spilled from said carrier, a prime mover, and power receiving and power imparting devices operable by said prime mover and simultaneously operating said feeder, said cam, said stirring device and said carrier.

2. In a corn popping and vending machine, the combination of a stationary electric stove provided with a spillway in its side, a rotary stirring device operating in said stove and provided with radially extending fingers for sweeping the stove, a gate slidably mounted on said stove and over the spillway therein, a pivoted lever attached to said gate, a revolving cam arranged to raise and lower said lever, a hopper, a feeder communicating alternately with said hopper and said stove, a travelling carrier arranged to carry pop corn spilled from said stove, a bin arranged to receive the pop corn spilled from said carrier, a sprinkler rotatably arranged above said carrier, and having a communication with a supply of melted butter, means to impart intermittent rotation to the sprinkler to intermittently sprinkle butter on the corn, a prime mover, and power receiving and power imparting devices operative by said prime mover for simultaneously operating said feeder, said cam, said stirring device and said carrier.

3. In a corn popping and vending machine, the combination of a stationary electric stove provided with a spillway in its side, a rotary stirring device operating in said stove and provided with radially extending fingers for sweeping the stove, a gate slidably mounted on said stove and over the spillway therein, a pivoted lever attached to said gate, a revolving cam arranged to raise and lower said lever, a hopper communicating with said stove, a rotary feeder communicating alternately with said hopper and said stove, a travelling carrier arranged to carry popcorn spilled from the stove, a bin arranged to receive the pop corn spilled from said carrier, a sprinkler rotatably arranged above said carrier and having communication with a supply of melted butter, a discharge chute, means for delivering the pop corn from the bin to the discharge chute, a seasoning chamber, a roller revolubly mounted in said chamber and adapted to discharge the contents thereof to the corn while being discharged, a prime mover, and power receiving and power imparting devices operable by said prime mover and simultaneously operating said feeder, said stirring device, said carrier, said cam, said sprinkler, said delivery means and said roller.

4. In a corn-popping and dispensing apparatus, an operating-shaft, an oven having its side wall provided with an opening and a door, a hopper having a chute communicating with the oven, a cylindrical receptacle in the hopper and provided with a slot, an endless carrier disposed below the opening of said oven, mechanism connecting the carrier with the operating-shaft, an apertured seasoning receptacle above the endless carrier mounted to permit rotation, a stirring-shaft within the oven, mechanism connecting the stirring-shaft with the operating-shaft, a cam shaft, mechanism connecting the cam shaft with the operating-shaft, mechanism connected with the cylindrical receptacle and movable by the cam shaft for causing rotation of said cylindrical receptacle, and mechanism connected with the door and movable by the cam shaft for causing a sliding movement of said door, said operating-shaft being rotatable for simultaneous actuation of the cam shaft, the stirring-shaft and said endless carrier.

5. In a corn-popping and dispensing apparatus, an operating-shaft, an oven having an opening and a door, a hopper having a chute communicating with the oven, a cylindrical receptacle provided with a slot and mounted to permit rotation in the hopper, a carrier-shaft provided with discs and having journalled bearings outwardly of the opening of said oven, a downwardly convergent funnel below and adjacent to the carrier-shaft, a tamping-bar in the funnel and pivotally connected with the discs of the carrier-shaft, a carrier engaging the carrier-shaft, mechanism connecting the carrier with the operating-shaft, an apertured seasoning-receptacle above the carrier mounted to permit rotation, a stirring-shaft within the oven, mechanism connecting the stirring-shaft with the operating-shaft, a cam-shaft, mechanism connecting the cam-shaft with the operating-shaft, mechanism connected with the cylindrical receptacle and movable by the cam-shaft for rotating said cylindrical receptacle, a lever movable by the cam-shaft for causing a rotation of the seasoning-receptacle, and a lever movable by the cam-shaft for causing a sliding movement of said door, said operating-shaft being rotatable for simultaneous actuation of the cam-shaft, the stirring-shaft and said carrier-shaft.

6. In a corn-popping and dispensing apparatus, the combination of an oven having an opening in its side, a pair of side-plates projecting outwardly from said opening, a carrier-shaft journalled in the side-plates, a carrier between the side plates movable with the carrier-shaft, a funnel below the carrier-shaft, a tamping-bar in the funnel movable vertically by the carrier-shaft, a dispensing-member having radially disposed wings and mounted to permit rotation below said funnel, an apertured receptacle adjacent to the dispensing member, a cylinder mounted to permit rotation in said receptacle, a vertically disposed rotatable shaft, mechanism movable by said vertically disposed shaft for causing rotation of the carrier-shaft, and mechanisms movable by the vertically disposed shaft for causing rotation of the dispensing member and the cylinder in said receptacle.

7. In a corn-popping and dispensing apparatus, a cylindrical oven having an opening in its side, a stirring-shaft disposed centrally of the oven, a door slidingly mounted on the oven, resilient means normally tending to prevent a movement of the door, side-plates below said opening projecting outwardly from the oven, a hopper having a chute communicating with the oven, a slotted cylindrical receptacle having journalled bearings in the hopper, a carrier-shaft provided with discs and journalled in the side-plates, a carrier between the side-plates movable by rotation of the carrier-shaft, a funnel below the carrier-shaft, a tamping-bar mounted upon the discs of and movable vertically by the movements of the carrier-shaft, means for rotating the stirring-shaft, means for moving said door against the force of said resilient means, means for rotating the cylindrical receptacle in said hopper, and means for rotating the carrier-shaft.

In testimony whereof, I have affixed my signature in presence of two witnesses.

WILLARD A. PRIEST.

Witnesses:
HIRAM A. STURGES,
ARTHUR H. STURGES.